Patented Dec. 16, 1930

1,785,074

UNITED STATES PATENT OFFICE

LEO P. CURTIN, OF FREEHOLD, NEW JERSEY, ASSIGNOR TO CURTIN-HOWE CORPORATION, A CORPORATION OF NEW YORK

FUNGICIDAL AND INSECTICIDAL COMPOSITION AND METHOD OF PREPARING SAME

No Drawing.    Application filed January 25, 1927.  Serial No. 163,575.

This invention relates to methods of preparing aqueous solutions containing free arsenous oxid, or arsenous acid, and to the solutions themselves, and to compositions, particularly emulsions, comprising the solutions. Such solutions and compositions are capable of many industrial applications, as for the preservation and fireproofing of timber and other combustible materials, as weed killers, etc. The invention also includes materials, such as wood, impregnated with fungicidal and insecticidal residues derived from such solutions and compositions.

The solubility of arsenous oxid has been often investigated, but with quite discordant results. Arsenous oxid, $As_2O_3$, exists in at least three isomeric forms, the common sublimed product which consists of crystalline octahedra; a rhombic crystalline form which is of no practical interest; and an amorphous or vitreous form which is obtained by melting the other forms under pressure or by sublimation under certain peculiar conditions. The vitreous form, on standing, loses its transparency and reverts to the octahedral crystalline form. The latter isomer is the one to which this invention relates.

A commonly accepted value for the solubility of arsenous oxid in water is 1.7% at 20° C. while at the boiling temperature solubilities ranging from 9.5 to 11.5% have been reported. It has also been found that the vitreous form is soluble to the extent of 3.7% at the ordinary temperature.

It is difficult to prepare even 1% solutions of arsenous oxid by boiling the substance with distilled water. The arsenous oxid is not readily wetted by the water, somewhat resembling flour in its tendency to remain dry and unmoistened. The surface of the arsenous oxid appears to be protected by a film of air or other adsorbed gas, and prolonged boiling is required to dislodge any considerable portion of this film. The problem of dissolving the oxid may therefore be regarded as primarily one of interfacial surface tension. Under ordinary conditions, the adhesive force between arsenous oxid and air is greater than that between arsenous oxid and water. If these relations could be reversed, it seems probable that arsenous oxid would dissolve in a normal manner.

I have found that certain materials of alkaline reaction, and especially sodium carbonate, sodium hydroxid, barium hydroxid and aqueous ammonia, not only lower the interfacial tension between the oxid and the water, but apparently by forming temporary combinations with the arsenous oxid (arsenites) they act also as "carriers". Such arsenites under the conditions employed for dissolving the arsenous oxid presumably are hydrolyzed into arsenous acid and free alkali, which latter is capable of reacting with more arsenous oxid, such cyclic regeneration continuing until equilibrium conditions are reached. The amount of free alkali decreases progressively as the concentration of arsenous acid increases.

Following are certain specific embodiments of the invention, which is of course not limited to the particular chemicals and proportions cited by way of example:

*Example 1.*—1 part by weight of sodium carbonate, $Na_2CO_3$, in 100 parts of boiling water, effected the solution of 12.5 parts of arsenous oxid in three to four minutes. Assuming two parts of the oxid to be combined as sodium arsenite, approximately 10.5 parts existed in solution, presumably as arsenous acid. This corresponds substantially to the average reported value for the maximum solubility of arsenous oxid in boiling water.

*Example 2.*—0.025 parts by weight of sodium carbonate in 100 parts of boiling water completely dissolved 2.5 parts of arsenous oxid in two minutes. The resulting solution was of a concentration suitable for use as a wood preservative.

*Example 3.*—0.05 parts of barium hydroxid octahydrate $(Ba(OH)_2.8H_2O)$ in 100 parts of hot water dissolved 2.5 parts of arsenous oxid rapidly and completely. Although barium arsenite is generally regarded as an insoluble salt, it was found that a small amount of it was held in solution in presence of a large excess of arsenous acid; and that the solution would tolerate a total of 0.40 parts of the hydroxid without appreciable precipitation of barium arsenite. This corresponds to a ratio of ten equivalents of arsenic to one of barium.

Ammonia in low concentrations effects the solution of considerable amount of arsenous oxid. Calcium and the other alkaline earth metal hydroxids also have some solvent action upon arsenous oxid, but only very small concentrations can be used by reason of the insolubility of the corresponding arsenites.

Obviously, instead of employing such alkalies and alkaline compounds as are mentioned above, I may use salts, particularly such as contain a strong base in combination with a weak acid, which undergo hydrolysis with liberation of the base. Thus for example sodium arsenite may replace sodium carbonate as a dissolving agent for arsenous oxid.

It is characteristic of solutions prepared in accordance with this invention that they contain arsenous acid in an aqueous menstruum, in presence of a basic substance (as sodium carbonate, barium hydroxid, ammonia etc.) the base in less than one-third of the equi-molecular proportion to the arsenous acid. In the most acidic of the arsenic salts (the acid arsenites of sodium and potassium $NaH(AsO_2)_2$) the molar ratio of sodium to elementary arsenic is 1:2. In solutions prepared in accordance with my invention the ratio of base to arsenic is always less than this molar ratio. The method may be defined as the dissolving of arsenous oxid in an aqueous solution of a metallic hydroxid, carbonate or equivalent base, in which the final ratio of metal to arsenic does not exceed 1:3 for monovalent metals, or 1:6 for divalent metals.

As stated above these solutions find industrial applications. As weed killers they possess the advantage over the commonly used sodium arsenite that they leave the arsenic on the sprayed area, after drying, in a difficultly soluble and hence relatively permanent form.

The solutions possess to an exceptional degree the property of wetting and penetrating wood, and this property is enhanced by the presence of ammonia.

The arsenic-barium hydroxid composition is of particular value for the preservation of wood. On drying, about one-tenth of the arsenic is precipitated as the insoluble barium meta-arsenite, the remainder as the difficultly soluble octahedral arsenous oxid. This latter is very resistant to solution (loss by leaching) by reason of its non-wetting quality, but is sufficiently soluble to inhibit insect and fungous attack. Arsenous oxid completely inhibits the growth of the wood rotting fungus, *Fomes annosus*, at concentrations of 150 parts per million, being equal or slightly superior to mercuric chloride, in this respect. The barium meta-arsenite is soluble in the acid liberated by the fungi and is a powerful insecticide and fungicide.

Also, this arsenic-barium solution has been found to emulsify readily with crude petroleum and other liquid bitumens, forming emulsions of remarkable stability. Apparently the arsenic lowers the interfacial surface tension, which makes for ease of emulsification, while the barium reacts with certain bodies in the petroleum forming substances which stabilize the emulsion. Emulsions from the sodium and ammonia preparations are decidedly less permanent. Similar emulsions with coal-tar creosote and certain other organic liquids are easily prepared, but break down quickly. Such emulsions may be stabilized by the addition of a suitable emulsifying agent such as ten percent of asphaltic base petroleum. In wood treated with this preservative in emulsion form, the arsenic is further protected from leaching by the water-excluding property of the oil component.

I claim:

1. Method of preparing arsenical solutions comprising dissolving arsenous oxid in an aqueous solution of a base, the base not in excess of one-third of the molar equivalent of the oxid.

2. Method of preparing arsenical solutions comprising dissolving arsenous oxid in an aqueous solution of barium hydroxid, the barium hydroxid not in excess of one-third of the molar equivalent of the oxid.

3. The hereindescribed solution of arsenous oxid in an aqueous solution of a base, the base not in excess of one-third of the molar equivalent of the oxid.

4. The hereindescribed aqueous solution including barium arsenite and arsenous acid, the barium not in excess of one-third of the molar equivalent of the arsenic acid.

5. Fibrous organic material which has been impregnated with the herein described solution of arsenous oxide and an aqueous solution of a base, the base not in excess of one-third of the molar equivalent of the oxid.

In testimony whereof, I affix my signature.

LEO P. CURTIN.

CERTIFICATE OF CORRECTION.

Patent No. 1,785,074.                 Granted December 16, 1930, to

LEO P. CURTIN.

It is hereby certified that the above numbered patent was erroneously issued to "Curtin-Howe Corporation, a corporation of New York", whereas said patent should have been issued to The Western Union Telegraph Company, of New York, N. Y., a corporation of New York, said corporation being assignee of the entire interest in said invention, as shown by the records of assignments in this office; and that the said Letters Patent should be read with this correction therein that the same may conform to the record of the case in the Patent Office.

Signed and sealed this 31st day of March, A. D. 1931.

(Seal)

M. J. Moore,
Acting Commissioner of Patents.